(12) United States Patent
Wang (10) Patent No.: US 12,120,261 B2
(45) Date of Patent: Oct. 15, 2024

(54) INCOMING CALL PROCESSING METHOD AND ELECTRONIC DEVICE (71) Applicant: VIVO MOBILE COMMUNICATION CO., LTD., Guangdong (CN)

(72) Inventor: Chuxin Wang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 328 days.

(21) Appl. No.: 17/672,255

(22) Filed: Feb. 15, 2022

(65) Prior Publication Data

US 2022/0174146 A1 Jun. 2, 2022

Related U.S. Application Data (63) Continuation of application No. PCT/CN2020/100438, filed on Jul. 6, 2020.

(30) Foreign Application Priority Data

Aug. 21, 2019 (CN) .......................... 201910772349.X (51) Int. Cl.
*H04M 1/72484* (2021.01)
*H04M 1/60* (2006.01)
(Continued)

(52) U.S. Cl.
CPC ..... *H04M 1/72484* (2021.01); *H04M 1/6066* (2013.01); *H04M 1/725* (2013.01); *H04M 3/42059* (2013.01)

(58) Field of Classification Search
CPC .. H04M 1/57; H04M 1/6066; H04M 1/72448; H04M 1/72469; H04M 1/72484;
(Continued)

(56) References Cited

U.S. PATENT DOCUMENTS 8,954,895 B1 * 2/2015 Yaksick .............. G06F 3/04883
715/863
11,190,630 B1 * 11/2021 Engelke ............ H04M 3/42391
(Continued)

FOREIGN PATENT DOCUMENTS

| CN | 102572053 A | 7/2012 |
|----|-------------|--------|
| CN | 102932536 A | 2/2013 |

(Continued)

OTHER PUBLICATIONS

The First Office Action of Priority Application No. CN 201910772349.X issued by the Chinese Patent Office on Jul. 2, 2020.
(Continued)

*Primary Examiner* — Tan H Trinh
(74) *Attorney, Agent, or Firm* — IP & T GROUP LLP (57) ABSTRACT

An incoming call processing method includes: in a case that an electronic device is connected to an external device, receiving an incoming call answering request; displaying an incoming call screen, where the incoming call screen includes a first answering mode icon and a second answering mode icon; and answering an incoming call through the external device if a first input performed on the first answering mode icon is received, and answering the incoming call through the electronic device if a second input performed on the second answering mode icon is received.

12 Claims, 7 Drawing Sheets (51) Int. Cl.
*H04M 1/725* (2021.01)
*H04M 3/42* (2006.01)

(58) Field of Classification Search
CPC .. H04M 1/725; H04M 19/04; H04M 2250/02; H04M 3/42059
USPC ........................................................ 455/76.1
See application file for complete search history.

(56) References Cited

U.S. PATENT DOCUMENTS

| | | | |
|---|---|---|---|
| 2010/0303244 A1 | 12/2010 | Kim et al. | |
| 2014/0179281 A1* | 6/2014 | Kim | G10L 13/033 455/414.1 |
| 2016/0103653 A1* | 4/2016 | Jang | H03G 3/02 381/107 |
| 2016/0142533 A1* | 5/2016 | Yoo | H04M 1/575 455/567 |
| 2016/0173683 A1* | 6/2016 | Abreu | H04M 3/42042 455/414.1 |
| 2017/0031556 A1* | 2/2017 | Yang | G06F 3/04817 |
| 2017/0155755 A1* | 6/2017 | Kondo | H04M 1/72454 |
| 2018/0262612 A1* | 9/2018 | Wang | H04M 3/42221 |
| 2018/0288220 A1* | 10/2018 | Yin | H04M 1/72469 |

FOREIGN PATENT DOCUMENTS

| | | |
|---|---|---|
| CN | 103513769 A | 1/2014 |
| CN | 104601815 A | 5/2015 |
| CN | 105306729 A | 2/2016 |
| CN | 106161768 A | 11/2016 |
| CN | 106921803 A | 7/2017 |
| CN | 108521520 A | 9/2018 |
| CN | 110138937 A | 8/2019 |
| CN | 110545351 A | 12/2019 |
| EP | 2849417 A1 | 3/2015 |
| WO | 2010/110959 A2 | 9/2010 |
| WO | 2017/165053 A1 | 9/2017 |

OTHER PUBLICATIONS

International Search Report and Written Opinion of International Application No. PCT/CN2020/100438 issued by the Chinese Patent Office on Oct. 12, 2020.

* cited by examiner

INCOMING CALL PROCESSING METHOD AND ELECTRONIC DEVICE

CROSS-REFERENCE OF RELATED APPLICATIONS

This application is a Bypass Continuation Application of PCT/CN2020/100438 filed on Jul. 6, 2020, which claims priority to Chinese Patent Application No. 201910772349.X filed on Aug. 21, 2019, which are incorporated herein by reference in their entirety.

TECHNICAL FIELD

The present disclosure relates to the field of processing technologies of electronic devices, and in particular, to an incoming call processing method and an electronic device.

BACKGROUND

At present, after a mobile phone is connected to a Bluetooth headset, when the mobile phone is operated to answer a call, the call is answered through Bluetooth by default. When a user wants to use the mobile phone to answer the call directly, the user needs to answer the call first, and then switch an answering method to the earpiece or hands-free mode to switch to mobile phone answering.

SUMMARY

According to a first aspect, an embodiment of the present disclosure provides an incoming call processing method, including:
  in a case that an electronic device is connected to an external device, receiving an incoming call answering request;
  displaying an incoming call screen, where the incoming call screen includes a first answering mode icon and a second answering mode icon; and
  answering an incoming call through the external device if a first input performed on the first answering mode icon is received, and answering the incoming call through the electronic device if a second input performed on the second answering mode icon is received.

According to a second aspect, an embodiment of the present disclosure further provides an electronic device, including:
  a first receiving module, configured to: in a case that an electronic device is connected to an external device, receive an incoming call answering request;
  a first display module, configured to display an incoming call screen, where the incoming call screen includes a first answering mode icon and a second answering mode icon; and
  an execution module, configured to: answer an incoming call through the external device if a first input performed on the first answering mode icon is received, and answer the incoming call through the electronic device if a second input performed on the second answering mode icon is received.

According to a third aspect, an embodiment of the present disclosure further provides an electronic device, including: a memory, a processor, and a computer program stored in the memory and executable on the processor. When the computer program is executed by the processor, steps of the foregoing incoming call processing method are implemented.

According to a fourth aspect, an embodiment of the present disclosure further provides a non-transitory computer-readable storage medium. The non-transitory computer-readable storage medium stores a computer program. When the computer program is executed by a processor, steps of the foregoing incoming call processing method are implemented.

DETAILED DESCRIPTION OF THE EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of the present disclosure shall fall within the protection scope of the present disclosure.

Usually, in an incoming call processing method, the answering mode can be switched only after the incoming call is answered. This method distracts the user's attention and increases the user's call duration.

Figure 1:
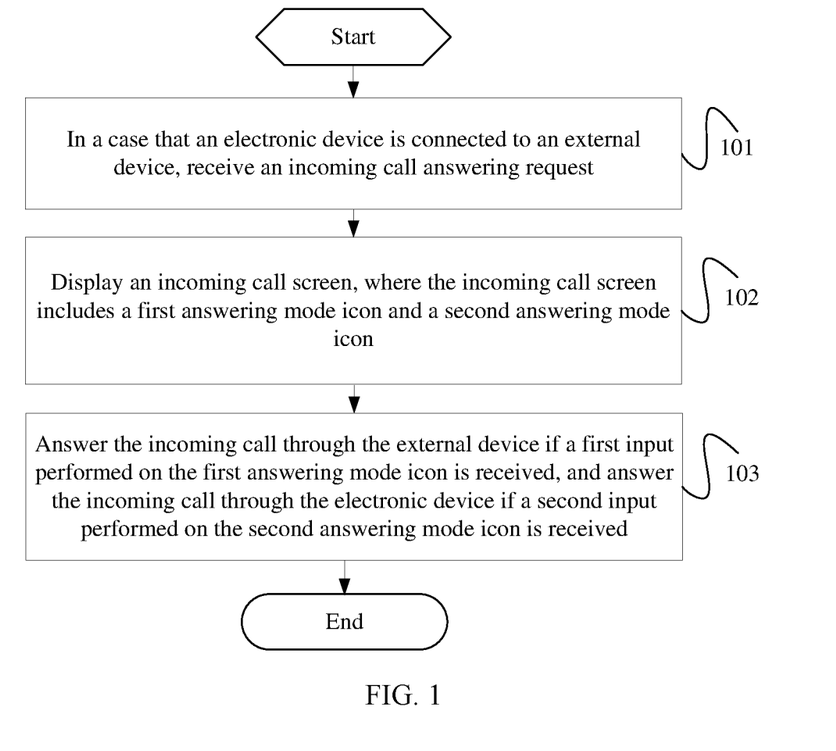
FIG. 1 is a schematic flowchart of an incoming call processing method according to an embodiment of the present disclosure.

As shown in FIG. 1, an embodiment of the present disclosure provides an incoming call processing method, applied to an electronic device and including:

Step 101: In a case that an electronic device is connected to an external device, receive an incoming call answering request.

It should be noted that the external device is an answering device, for example, a Bluetooth headset or a Bluetooth speaker, connected to the electronic device through wireless communication.

Step 102: Display an incoming call screen, where the incoming call screen includes a first answering mode icon and a second answering mode icon.

It should be noted that the first answering mode icon indicates that the incoming call is answered through the external device, and the second answering mode icon indicates that the incoming call is answered through the electronic device. For example, answering the call through the electronic device may be implemented through the earpiece of the electronic device or the speaker of the electronic device (that is, the hands-free mode). The second answering mode icon may include at least one icon.

Figure 2:
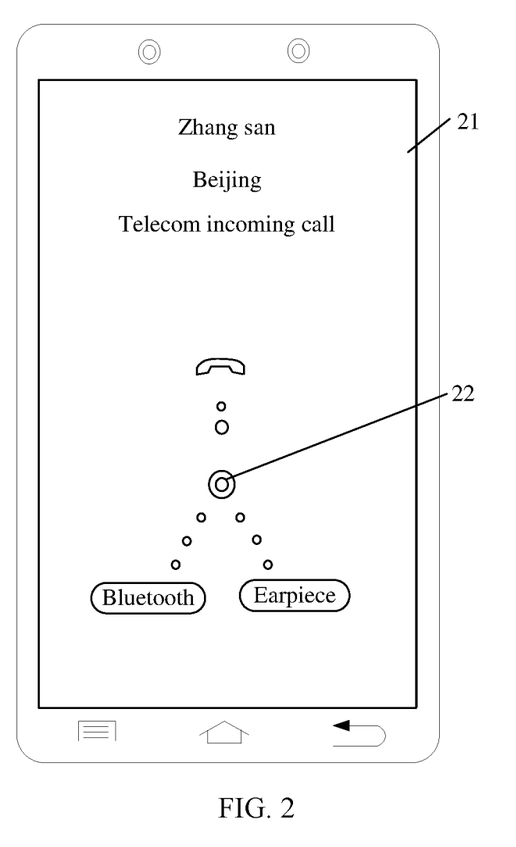
FIG. 2 is a first schematic diagram of displaying an incoming call screen.

For example, when the electronic device is connected to a Bluetooth headset, and the electronic device detects an incoming call, two answering mode icons are displayed on the incoming call screen. As shown in FIG. 2, an incoming call screen 21 in FIG. 2 displays two icons: "Bluetooth" and "handset". The "Bluetooth" icon represents that a Bluetooth headset is used to answer the incoming call, and the "handset" icon represents that the earpiece of the electronic device is used to answer the incoming call. It should be noted that FIG. 2 only shows function icons related to the embodiments of the present disclosure, and other function icons are omitted.

Step 103: Answer the incoming call through the external device if a first input performed on the first answering mode icon is received, and answer the incoming call through the electronic device if a second input performed on the second answering mode icon is received.

It should be noted that for example, when the electronic device is connected to a Bluetooth headset, the electronic device does not directly answer the incoming call in the Bluetooth mode according to the user's answering operation, and instead first displays the icons indicating different answering modes on the incoming call screen, so that the user selects the answering mode, and answers the incoming call in the answering mode selected by the user.

It should also be noted that the first input may be an operation of pressing and sliding the answering icon on the incoming call screen towards the first answering mode icon, and the second input may be an operation of pressing and sliding the answering icon on the incoming call screen towards the second answering mode icon.

Still refer to FIG. 2. When the user presses and slides an answering icon 22 towards the "Bluetooth" icon, the electronic device answers the incoming call in the Bluetooth mode, that is, the electronic device plays sound of the incoming call through the Bluetooth headset. When the user presses and slides the answering icon 22 towards the "earpiece" icon, the electronic device answers the incoming call in the earpiece mode, that is, the electronic device plays sound of the incoming call through its own earpiece.

It should also be noted that the embodiments of the present disclosure also provide a method for a user to switch an answering mode in an incoming call answering process, which is implemented as follows:

receiving a third input; and switching the electronic device from a first target answering mode to a second target answering mode in response to the third input; where the first target answering mode is answering the incoming call through the external device, and the second target answering mode is answering the incoming call through the electronic device; or the first target answering mode is answering the incoming call through the electronic device, and the second target answering mode is answering the incoming call through the external device.

For example, if the first answering mode icon is selected when answering an incoming call, the first target answering mode is answering the incoming call through the external device, and the second target answering mode is answering the incoming call through the electronic device. For example, if the second answering mode icon is selected when answering an incoming call, the first target answering mode is answering the incoming call through the electronic device, and the second target answering mode is answering the incoming call through the external device.

For example, the third input of the embodiments of the present disclosure is:

1. The third input is that an action of pressing a volume key of the external device meets a preset condition.

For example, the preset condition includes one of the following.

A11. The number of times a volume key is pressed is greater than or equal to a preset number of times.

It should be noted that the preset number of times is a preset threshold, and the threshold is stored in the electronic device. Generally, the preset number of times should be an integer greater than 1. For example, the volume increase key of the Bluetooth headset is continuously pressed for 4 times. This indicates that the incoming call answering mode needs to be switched, and the electronic device receives the third input.

A12. Two volume keys are pressed simultaneously.

It should be noted that the two volume keys are the volume increase key and the volume decrease key. For example, the volume increase key and the volume decrease key of the Bluetooth headset are pressed simultaneously. This indicates that the incoming call answering mode needs to be switched, and the electronic device generates an answering mode switching instruction.

2. The third input is the user's operation performed on a physical key on the electronic device.

For example, an implementation process in this manner is as follows:

When the power key of the electronic device is pressed, if it is detected that the pressing time of the power key is greater than or equal to a preset time, the operation is defined as the third input.

It should be noted that in this case, the power key is used to provide a manner of collecting the third input. When the user presses the power key on the electronic device, the power key is usually a physical key disposed on the side of the electronic device. When the duration of pressing the power key exceeds a preset duration, it indicates that the incoming call answering mode needs to be switched, and the electronic device generates an answering mode switching instruction. For example, the preset duration is preset and stored in the electronic device.

3. The third input is the user's operation performed on a function key on the electronic device.

It should be noted that the operation may be a click operation, a slide operation, a double-click operation, or the like. In this manner, the user selects, directly according to the function icon on the incoming call answering interface, an answering mode that needs to be switched to. The electronic device switches, according to the collected user's selection operation, the answering mode to an answering mode selected by the user.

It should also be noted that after the switching the electronic device from a first target answering mode to a second target answering mode in response to the third input, the method further includes:

determining whether a calling contact is a preset contact; and     if the calling contact is a preset contact, adjusting a volume in the second target answering mode to a volume matching the preset contact.

It should also be noted that in this case, the user may preset answering volumes corresponding to some contacts. For example, when some contacts speak loudly, corresponding volumes of the contacts are set to be slightly low. When some contacts speak quietly, corresponding volumes of the contacts are set to be slightly high. This matching relationship is stored in the electronic device. When answering an incoming call from a specific contact, the volume may be adjusted according to a specified volume that matches the contact, to ensure that the volume of the call meets the need of the user.

It should also be noted that to help the user to switch the answering mode, before the receiving a third input, and after the answering the incoming call through the external device if a first input performed on the first answering mode icon is received, and answering the incoming call through the electronic device if a second input performed on the second answering mode icon is received, the method further includes:

displaying a target answering mode icon on the incoming call answering interface;

where an answering mode indicated by the target answering mode icon is different from an answering mode currently used for the call.

Optionally, each time after the mode is switched, the incoming call answering interface displays an answering mode icon corresponding to an answering mode different from an answering mode currently used in the call, to help the user to perform a switching operation and avoid invalid switching.

Optionally, after step 103, the method of the embodiments of the present disclosure further includes:

obtaining an answering mode currently used for the call; and     adjusting a volume in the answering mode currently used for the call to a volume that matches the answering mode currently used for the call;

where the answering mode currently used for the call is answering the incoming call through the external device or answering the incoming call through the electronic device.

It should be noted that in this case, the user may set the answering volume corresponding to the answering mode. For example, when the answering mode of answering the incoming call through the external device is used, the volume corresponding to this mode is set to be slightly low to avoid excessively high sound and leakage of call content. When answering the incoming call through the electronic device is implemented through the earpiece, the volume corresponding to this mode is slightly loud to ensure that the user can clearly hear the call voice of the other party. This matching relationship is stored in the electronic device. When the incoming call is answered in a specific answering mode, the volume can be adjusted according to a specified volume that matches the answering mode, to ensure that the call volume meets the user's usage requirement.

In the following, the external device is, for example, a Bluetooth headset, and an application of the embodiments of the present disclosure is described as follows.

Figure 3:
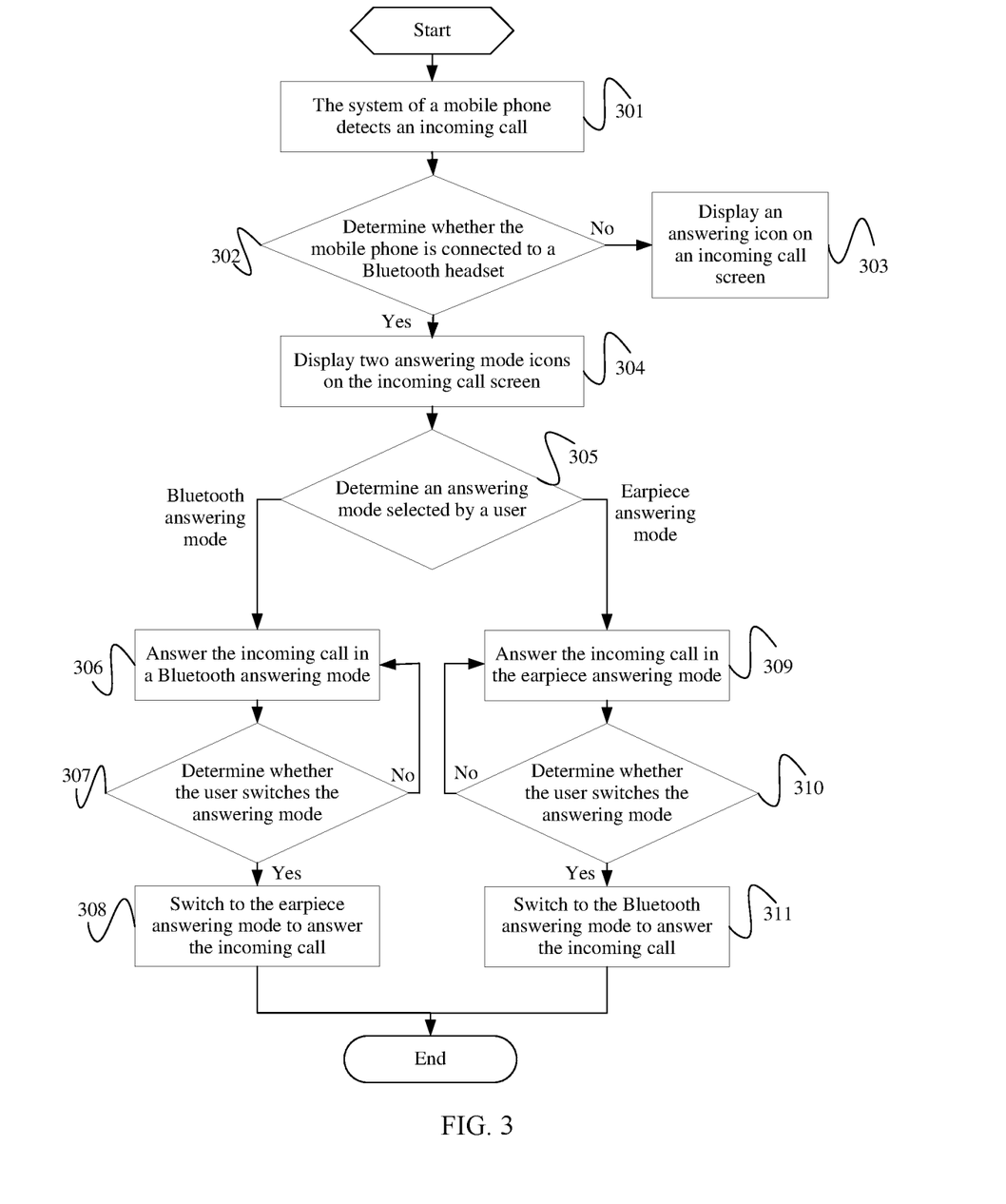
FIG. 3 is a schematic flowchart of an application of an incoming call processing method according to an embodiment of the present disclosure.

As shown in FIG. 3, an implementation process for answering an incoming call through a mobile phone is as follows.

Step 301: The system of the mobile phone detects an incoming call.

Step 302: Determine whether the mobile phone is connected to a Bluetooth headset.

If the mobile phone is not connected to the Bluetooth headset, perform step 303; and if the mobile phone is already connected to the Bluetooth headset, perform step 304.

Step 303: Display an answering icon on an incoming call screen.

Figure 4:
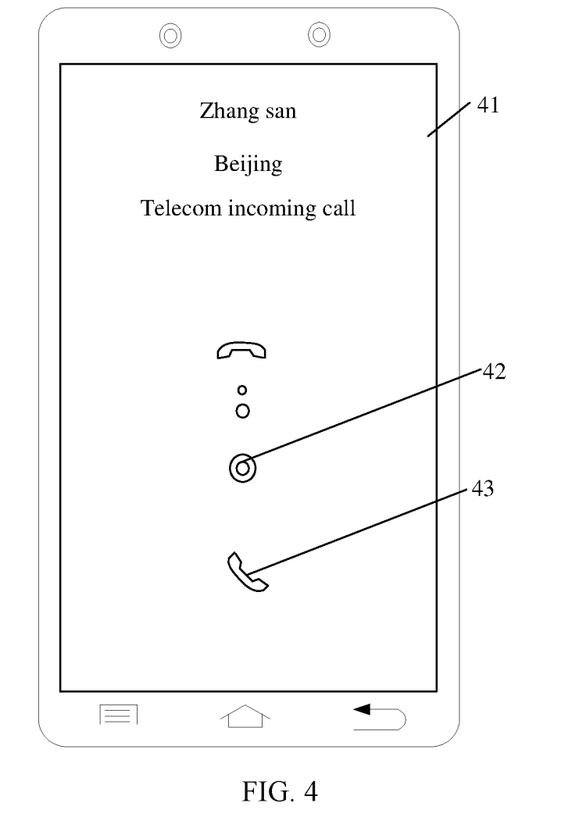
FIG. 4 is a second schematic diagram of displaying an incoming call screen.

For example, as shown in FIG. 4, an answering icon 42 and an answering key 43 are displayed on an incoming call screen 41. It should be noted that FIG. 4 shows only function icons related to the embodiments of the present disclosure, and other function icons are omitted.

Step 304: Display two answering mode icons on the incoming call screen.

For example, as shown in FIG. 2, two icons of "Bluetooth" and "earpiece" are displayed on the incoming call screen 21, to indicate different answering modes.

Step 305: Determine an answering mode selected by a user.

If the user uses the Bluetooth headset to answer the call, perform step 306; and if the user uses the earpiece to answer the call, perform step 309.

Step 306: Answer the incoming call through the Bluetooth headset.

Step 307: Determine whether the user switches the answering mode.

If the user does not switch the answering mode, proceed to step 306; otherwise, perform step 308.

For example, the determining method is as follows:

if it is detected that the volume key on the Bluetooth headset is continuously pressed for 4 times or the volume increase key and the volume decrease key are pressed simultaneously, the answering mode needs to be switched; or     if it is detected that a time of pressing the power key on the mobile phone is longer than a preset time, the answering mode needs to be switched; or     if it is detected that the user changes the answering mode to a method of using the earpiece of the electronic device to answer the incoming call, the answering mode needs to be switched.

Step 308: Switch to answer the incoming call through the earpiece of the electronic device.

Step 309: Answer the incoming call through the earpiece of the electronic device.

Step 310: Determine whether the user switches the answering mode.

If the user does not switch the answering mode, proceed to step 309; otherwise, perform step 311.

For example, the determining method is as follows:

if it is detected that the volume key on the Bluetooth headset is continuously pressed for 4 times or the volume increase key and the volume decrease key are pressed simultaneously, the answering mode needs to be switched; or     if it is detected that a time of pressing the power key on the mobile phone is longer than a preset time, the answering mode needs to be switched; or if it is detected that the user changes the answering mode to a method of using the Bluetooth headset to answer the incoming call, the answering mode needs to be switched.

Step 311: Switch to answer the incoming call through the Bluetooth headset.

It should be noted that the embodiments of the present disclosure can achieve the following beneficial effects:

when the user's mobile phone is connected to a Bluetooth headset, the embodiments of the present disclosure may provide the user with multiple answering methods when a call comes in; and the embodiments of the present disclosure can help the user to quickly switch the answering mode from Bluetooth answering to earpiece answering, or switch earpiece answering to Bluetooth answering, to reduce the user's call time. This helps the user to rapidly switch a call mode autonomously to adapt to requirements of different incoming call answering environments.

Figure 5:
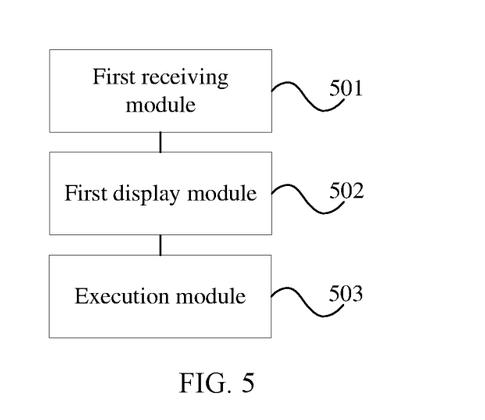
FIG. 5 is a first schematic diagram of modules of an electronic device according to an embodiment of the present disclosure.

As shown in FIG. 5 to FIG. 9, an embodiment of the present disclosure further provides an electronic device, including:

a first receiving module 501, configured to: in a case that an electronic device is connected to an external device, receive an incoming call answering request;

a first display module 502, configured to display an incoming call screen, where the incoming call screen includes a first answering mode icon and a second answering mode icon; and an execution module 503, configured to: answer the incoming call through the external device if a first input performed on the first answering mode icon is received, and answer the incoming call through the electronic device if a second input performed on the second answering mode icon is received.

Figure 6:
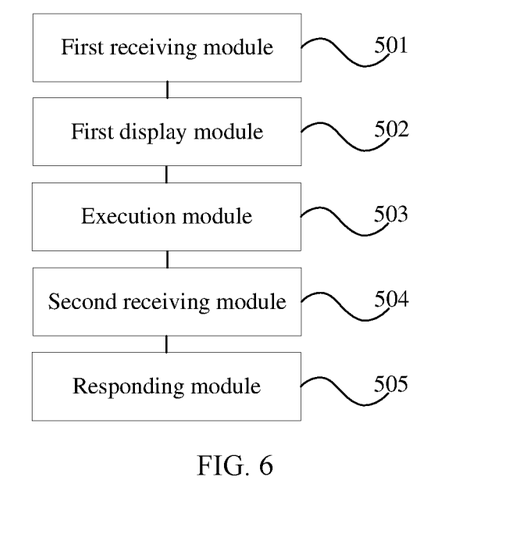
FIG. 6 is a second schematic diagram of modules of an electronic device according to an embodiment of the present disclosure.

Optionally, after the execution module 503 answers the incoming call through the external device if a first input performed on the first answering mode icon is received, and answers the incoming call through the electronic device if a second input performed on the second answering mode icon is received, the electronic device further includes:

a second receiving module 504, configured to receive a third input; and a responding module 505, configured to switch the electronic device from a first target answering mode to a second target answering mode in response to the third input; where the first target answering mode is answering the incoming call through the external device, and the second target answering mode is answering the incoming call through the electronic device; or the first target answering mode is answering the incoming call through the electronic device, and the second target answering mode is answering the incoming call through the external device.

Figure 7:
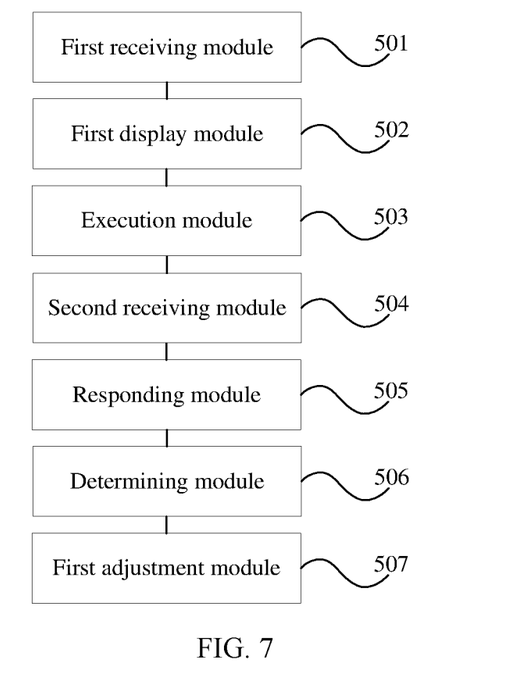
FIG. 7 is a third schematic diagram of modules of an electronic device according to an embodiment of the present disclosure.

Optionally, after the responding module 505 switches the electronic device from a first target answering mode to a second target answering mode in response to the third input; the electronic device further includes:

a determining module 506, configured to determine whether a calling contact is a preset contact; and a first adjustment module 507, configured to: if the calling contact is a preset contact, adjust a volume in the second target answering mode to a volume matching the preset contact.

Figure 8:
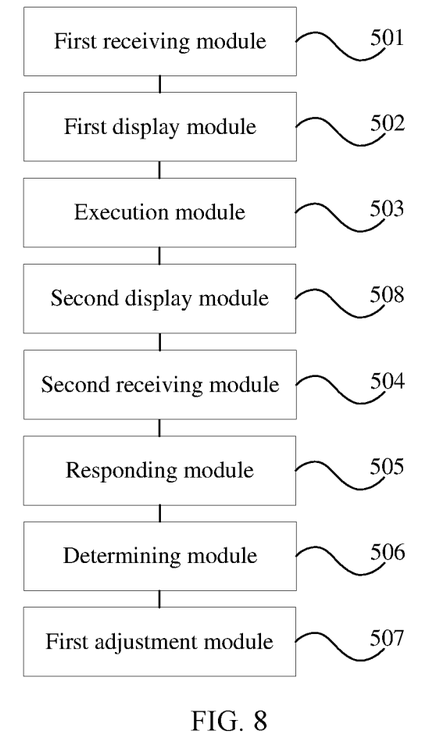
FIG. 8 is a fourth schematic diagram of modules of an electronic device according to an embodiment of the present disclosure.

Optionally, before the second receiving module 504 receives a third input, and after the execution module 503 answers the incoming call through the external device if a first input performed on the first answering mode icon is received, and answers the incoming call through the electronic device if a second input performed on the second answering mode icon is received, the electronic device further includes:

a second display module 508, configured to display a target answering mode icon on the incoming call answering interface;

where an answering mode indicated by the target answering mode icon is different from an answering mode currently used for the call.

Figure 9:
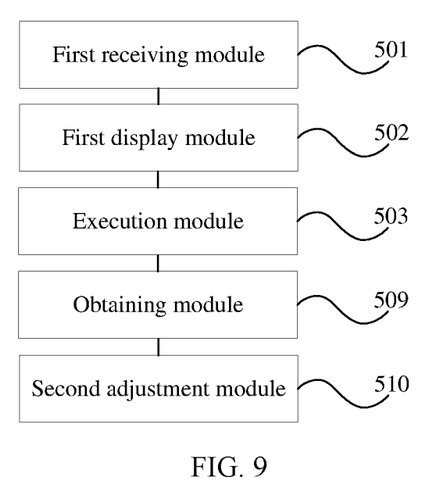
FIG. 9 is a fifth schematic diagram of modules of an electronic device according to an embodiment of the present disclosure.

Optionally, after the execution module 503 answers the incoming call through the external device if a first input performed on the first answering mode icon is received, and answers the incoming call through the electronic device if a second input performed on the second answering mode icon is received, the electronic device further includes:

an obtaining module 509, configured to obtain an answering mode currently used for the call; and a second adjustment module 510, configured to adjust a volume in the answering mode currently used for the call to a volume that matches the answering mode currently used for the call;

where the answering mode currently used for the call is answering the incoming call through the external device or answering the incoming call through the electronic device.

The electronic device provided in embodiments of the present disclosure can implement the processes implemented by the electronic device in the method embodiment of FIG. 1. To avoid repetition, details are not described herein again. In the embodiments of the present disclosure, if the electronic device is connected to an external device, when an incoming call request is received, the incoming call screen including the first answering mode icon and the second answering mode icon is displayed, and the call is directly answered in a corresponding answering mode according to the user's input. In this manner, the user can select the answering mode before answering the call, avoiding the problem of distracting the user' attention and increasing the user's call duration in the switching process, to improve user experience.

Figure 10:
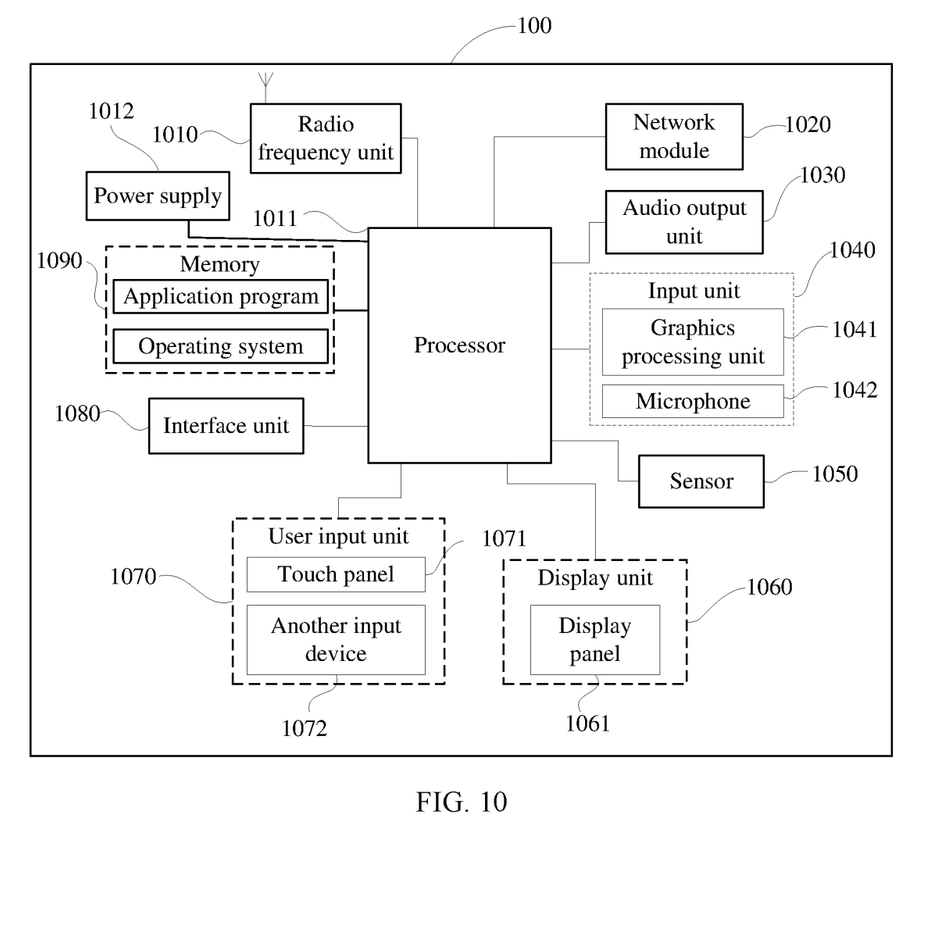
FIG. 10 is a schematic diagram of a hardware structure of an electronic device according to an embodiment of the present disclosure.

FIG. 10 is a schematic diagram of a hardware structure of an electronic device according to embodiments of the present disclosure.

The electronic device 100 includes but is not limited to components such as a radio frequency unit 1010, a network module 1020, an audio output unit 1030, an input unit 1040, a sensor 1050, a display unit 1060, a user input unit 1070, an interface unit 1080, a memory 1090, a processor 1011, and a power supply 1012. A person skilled in the art may understand that the structure of the electronic device shown in FIG. 10 constitutes no limitation on the electronic device. The electronic device may include more or fewer components than those shown in the figure, or a combination of some components, or an arrangement of different components. In this embodiment of the present disclosure, the electronic device includes, but is not limited to, a mobile phone, a tablet computer, a notebook computer, a palmtop computer, a vehicle-mounted terminal, a wearable device, a pedometer, or the like.

The processor 1011 is configured to: in a case that an electronic device is connected to an external device, receive an incoming call answering request; display an incoming call screen, where the incoming call screen includes a first answering mode icon and a second answering mode icon;

and if a first input performed on the first answering mode icon is received, answer the incoming call through the external device, and if a second input performed on the second answering mode icon is received, answer the incoming call through the electronic device.

In the embodiments of the present disclosure, if the electronic device is connected to an external device, when an incoming call request is received, the incoming call screen including the first answering mode icon and the second answering mode icon is displayed, and the call is directly answered in a corresponding answering mode according to the user's input. In this manner, the user can select the answering mode before answering the call, avoiding the problem of distracting the user' attention and increasing the user's call duration in the switching process, to improve user experience.

It should be understood that, in embodiments of the present disclosure, the radio frequency unit 1010 may be configured to receive and send information or receive and send a signal in a call process. For example, after receiving downlink data from a base station, the radio frequency unit sends the downlink data to the processor 1011 for processing. In addition, the radio frequency unit sends uplink data to the base station. Generally, the radio frequency unit 1010 includes but is not limited to an antenna, at least one amplifier, a transceiver, a coupler, a low noise amplifier, a duplexer, and the like. In addition, the radio frequency unit 1010 may also communicate with another device via a wireless communications system and network.

The electronic device provides users with wireless broadband Internet access through the network module 1020, for example, helps users receive and send e-mails, browse web pages, and access streaming media.

The audio output unit 1030 can convert audio data received by the radio frequency unit 1010 or the network module 1020 or stored in the memory 1090 into an audio signal, and output the audio signal into sound. Moreover, the audio output unit 1030 can further provide audio output related to a specific function performed the electronic device 100 (for example, call signal receiving sound and message receiving sound). The audio output unit 1030 includes a loudspeaker, a buzzer, a receiver, and the like.

The input unit 1040 is configured to receive an audio signal or a video signal. The input unit 1040 may include a graphics processing unit (GPU) 1041 and a microphone 1042. The graphics processing unit 1041 processes image data of a static picture or a video obtained by an image capture apparatus (for example, a camera) in a video capture mode or image capture mode. A processed image frame can be displayed on the display unit 1060. The image frame processed by the graphics processing unit 1041 may be stored in the memory 1090 (or another storage medium) or transmitted via the radio frequency unit 1010 or the network module 1020. The microphone 1042 may receive sound and can process the sound into audio data. The processed audio data can be converted into a format that can be sent to a mobile communications base station through the radio frequency unit 1010 in a telephone call mode, for outputting.

The electronic device 100 further includes at least one sensor 1050, for example, a light sensor, a motor sensor, and another sensor. For example, the light sensor includes an ambient light sensor and a proximity sensor. The ambient light sensor can adjust brightness of a display panel 1061 according to ambient light brightness. The proximity sensor can switch off the display panel 1061 and/or backlight when the electronic device 100 moves close to an ear. As a motion sensor, an accelerometer sensor can detect magnitude of acceleration in various directions (usually three axes), can detect magnitude and the direction of gravity when stationary, can be configured to identify electronic device postures (such as switching between a landscape mode and a portrait mode, related games, and magnetometer posture calibration), can perform functions related to vibration identification (such as a pedometer and a knock), and the like. The sensor 1050 may further include a fingerprint sensor, a pressure sensor, an iris sensor, a molecular sensor, a gyroscope, a barometer, a hygrometer, a thermometer, an infrared sensor, or the like. Details are not described herein.

The display unit 1060 is configured to display information entered by a user or information provided for a user. The display unit 1060 may include a display panel 1061. The display panel 1061 may be configured in a form of a liquid crystal display (LCD), an organic light-emitting diode (OLED), or the like.

The user input unit 1070 can be configured to receive entered number or character information, and generate key signal input related to user settings and function control of the electronic device. For example, the user input unit 1070 includes a touch panel 1071 and another input device 1072. The touch panel 1071 is also referred to as a touchscreen, and may collect a touch operation performed by a user on or near the touch panel 1071 (such as an operation performed by a user on the touch panel 1071 or near the touch panel 1071 by using any proper object or accessory, such as a finger or a stylus). The touch panel 1071 can include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 1011, and can receive and execute a command sent by the processor 1011. In addition, the touch panel 1071 may be implemented in various types such as resistive, capacitive, infrared, and surface acoustic wave. In addition to the touch panel 1071, the user input unit 107 may further include another input device 1072. For example, the another input device 1072 may include, but not limited to, a physical keyboard, a function key (for example, a volume control key or a switch key), a trajectory ball, a mouse, and a joystick. Details are not described herein again.

Optionally, the touch panel 1071 may cover the display panel 1061. When detecting the touch operation on or near the touch panel 1071, the touch panel 1071 transmits the touch operation to the processor 1011 to determine a type of a touch event, and then the processor 1011 provides corresponding visual output on the display panel 1061 based on the type of the touch event. Although in FIG. 10, the touch panel 1071 and the display panel 1061 are configured as two independent components to implement input and output functions of the electronic device, in some embodiments, the touch panel 1071 and the display panel 1061 can be integrated to implement the input and output functions of the electronic device. Details are not limited herein.

The interface unit 1080 is an interface for connecting an external apparatus and the electronic device 100. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 1080 can be configured to receive input from an external apparatus (for example, data information and power) and transmit the received input to one or more elements in the electronic device 100, or can be configured to transmit data between the electronic device 100 and the external apparatus.

The memory 1090 may be configured to store a software program and various data. The memory 1090 may mainly include a program storage area and a data storage area. The program storage area may store an operating system, an application program required by at least one function (such as a sound play function or an image play function), and the like. The data storage area may store data (such as audio data or an address book) created based on use of the mobile phone, and the like. In addition, the memory 1090 may include a high-speed random access memory or a nonvolatile memory, for example, at least one disk storage device, a flash memory, or another volatile solid-mode storage device.

The processor 1011 is a control center of the electronic device and connects all parts of the electronic device using various interfaces and circuits. By running or executing software programs and/or modules stored in the memory 1090 and by calling data stored in the memory 1090, the processor 1011 implements various functions of the electronic device and processes data, thus performing overall monitoring on the electronic device. The processor 1011 may include one or more processing units. Optionally, the processor 1011 may integrate an application processor and a modem processor. The application processor mainly processes an operating system, a user interface, an application program, and the like. The modem processor mainly processes wireless communication. It can be understood that the foregoing modem processor may not be integrated into the processor 1011.

The electronic device 100 may further include the power supply 1012 (such as a battery) supplying power to each component. Preferably, the power supply 1012 may be logically connected to the processor 1011 by using a power management system, so as to implement functions such as charging management, discharging management and power consumption management by using the power management system.

In addition, the electronic device 100 includes some functional modules not shown. Details are not described herein.

Optionally, an embodiment of the present disclosure further provides an electronic device, including a processor 1011, a memory 1090, and a computer program stored in the memory 1090 and executable on the processor 1011. When the computer program is executed by the processor 1011, the processes of the foregoing method embodiment are implemented and a same technical effect can be achieved. To avoid repetition, details are not described herein again.

An embodiment of the present disclosure further provides a non-transitory computer-readable storage medium. A computer program is stored in the non-transitory computer-readable storage medium. When being executed by a processor, processes of the foregoing embodiments of the incoming call processing method can be implemented, and a same technical effect can be achieved. To avoid repetition, details are not described herein. The non-transitory computer-readable storage medium is, for example, a read-only memory (ROM), a random access memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing an electronic device (which may be a mobile phone, a computer, a server, an air conditioner, a network device, or the like) to perform the methods described in the embodiments of the present disclosure.

The foregoing descriptions are merely optional implementations of the present disclosure. It should be noted that a person of ordinary skill in the art may make several improvements and polishing without departing from the principle of the present disclosure and the improvements and polishing shall fall within the protection scope of the present disclosure.

What is claimed is:

1. An incoming call processing method, comprising:
    in a case that an electronic device is connected to an external device, receiving an incoming call answering request;
    displaying an incoming call screen, wherein the incoming call screen comprises a first answering mode icon and a second answering mode icon; and
    answering an incoming call through the external device if a first input performed on the first answering mode icon is received, and answering the incoming call through the electronic device if a second input performed on the second answering mode icon is received; wherein
    after the answering the incoming call through the electronic device, the incoming call processing method further comprises:
    receiving a third input; and
    switching the electronic device from a first target answering mode to a second target answering mode in response to the third input; wherein
    the first target answering mode is answering the incoming call through the external device, and the second target answering mode is answering the incoming call through the electronic device; or
    the first target answering mode is answering the incoming call through the electronic device, and the second target answering mode is answering the incoming call through the external device.

2. The incoming call processing method according to claim 1, after the switching the electronic device from a first target answering mode to a second target answering mode in response to the third input, further comprising:
    determining whether a calling contact is a preset contact; and
    if the calling contact is a preset contact, adjusting a volume in the second target answering mode to a volume matching the preset contact.

3. The incoming call processing method according to claim 1, before the receiving a third input, and after the answering an incoming call through the external device if a first input performed on the first answering mode icon is received, and answering the incoming call through the electronic device if a second input performed on the second answering mode icon is received, further comprising:
    displaying a target answering mode icon on an incoming call answering interface; wherein
    an answering mode indicated by the target answering mode icon is different from an answering mode currently used for a call.

4. The incoming call processing method according to claim 1, after the answering an incoming call through the external device if a first input performed on the first answering mode icon is received, and answering the incoming call through the electronic device if a second input performed on the second answering mode icon is received, further comprising:
    obtaining an answering mode currently used for a call; and
    adjusting a volume in the answering mode currently used for a call to a volume that matches the answering mode currently used for a call; wherein
    the answering mode currently used for a call is answering the incoming call through the external device or answering the incoming call through the electronic device.

5. An electronic device, comprising: a memory, a processor, and a computer program stored in the memory and executable on the processor, wherein the computer program, when executed by the processor, causes the electronic device to perform:
    in a case that the electronic device is connected to an external device, receiving an incoming call answering request;
    displaying an incoming call screen, wherein the incoming call screen comprises a first answering mode icon and a second answering mode icon; and
    answering an incoming call through the external device if a first input performed on the first answering mode icon is received, and answering the incoming call through the electronic device if a second input performed on the second answering mode icon is received; wherein
    the computer program, when executed by the processor, causes the electronic device to further perform:
    receiving a third input; and
    switching the electronic device from a first target answering mode to a second target answering mode in response to the third input; wherein
    the first target answering mode is answering the incoming call through the external device, and the second target answering mode is answering the incoming call through the electronic device; or
    the first target answering mode is answering the incoming call through the electronic device, and the second target answering mode is answering the incoming call through the external device.

6. The electronic device according to claim 5, wherein the computer program, when executed by the processor, causes the electronic device to further perform:
    determining whether a calling contact is a preset contact; and
    if the calling contact is a preset contact, adjusting a volume in the second target answering mode to a volume matching the preset contact.

7. The electronic device according to claim 5, wherein the computer program, when executed by the processor, causes the electronic device to further perform:
    displaying a target answering mode icon on an incoming call answering interface; wherein
    an answering mode indicated by the target answering mode icon is different from an answering mode currently used for a call.

8. The electronic device according to claim 5, wherein the computer program, when executed by the processor, causes the electronic device to further perform:
    obtaining an answering mode currently used for a call; and
    adjusting a volume in the answering mode currently used for a call to a volume that matches the answering mode currently used for a call; wherein
    the answering mode currently used for a call is answering the incoming call through the external device or answering the incoming call through the electronic device.

9. A non-transitory computer-readable storage medium, wherein the non-transitory computer-readable storage medium stores a computer program, and the computer program, when executed by a processor of an electronic device, causes the electronic device to perform:
    in a case that the electronic device is connected to an external device, receiving an incoming call answering request;
    displaying an incoming call screen, wherein the incoming call screen comprises a first answering mode icon and a second answering mode icon; and
    answering an incoming call through the external device if a first input performed on the first answering mode icon is received, and answering the incoming call through the electronic device if a second input performed on the second answering mode icon is received; wherein
    the computer program, when executed by the processor, causes the electronic device to further perform:
    receiving a third input; and
    switching the electronic device from a first target answering mode to a second target answering mode in response to the third input; wherein
    the first target answering mode is answering the incoming call through the external device, and the second target answering mode is answering the incoming call through the electronic device; or
    the first target answering mode is answering the incoming call through the electronic device, and the second target answering mode is answering the incoming call through the external device.

10. The non-transitory computer-readable storage medium according to claim 9, wherein the computer program, when executed by the processor, causes the electronic device to further perform:
    determining whether a calling contact is a preset contact; and
    if the calling contact is a preset contact, adjusting a volume in the second target answering mode to a volume matching the preset contact.

11. The non-transitory computer-readable storage medium according to claim 9, wherein the computer program, when executed by the processor, causes the electronic device to further perform:
    displaying a target answering mode icon on an incoming call answering interface; wherein an answering mode indicated by the target answering mode icon is different from an answering mode currently used for a call.

12. The non-transitory computer-readable storage medium according to claim 9, wherein the computer program, when executed by the processor, causes the electronic device to further perform:

obtaining an answering mode currently used for a call; and adjusting a volume in the answering mode currently used for a call to a volume that matches the answering mode currently used for a call; wherein the answering mode currently used for a call is answering the incoming call through the external device or answering the incoming call through the electronic device.

\* \* \* \* \*